Dec. 24, 1963 T. S. BIRD 3,115,537
OPTICAL SYSTEM FOR OPTICAL PROJECTORS
Filed Sept. 19, 1961
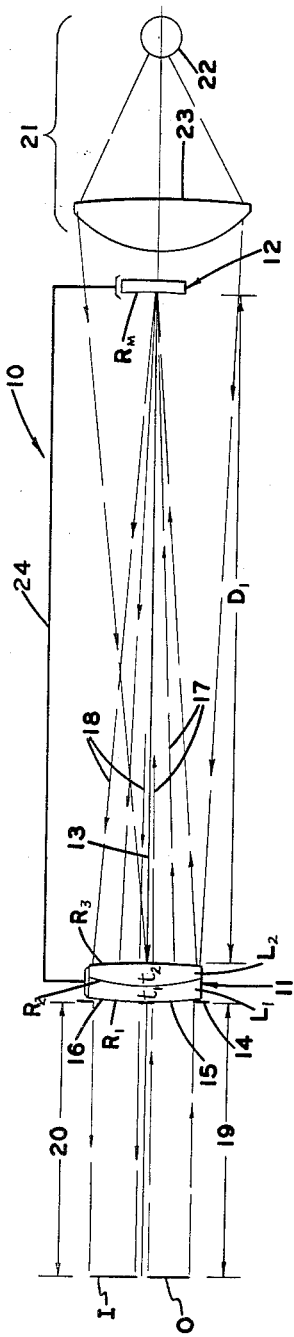
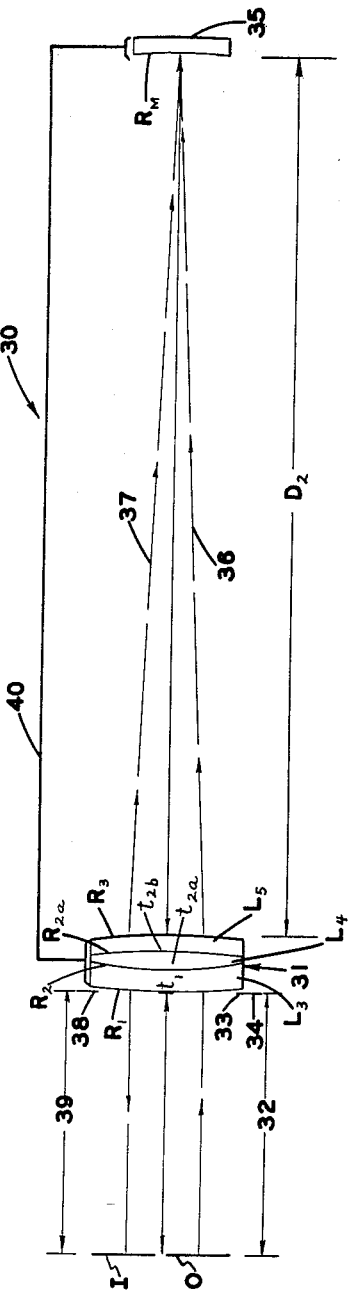
INVENTOR.
THOMAS S. BIRD
BY Frank C. Parker
ATTORNEY

3,115,537
OPTICAL SYSTEM FOR OPTICAL PROJECTORS
Thomas S. Bird, Gates, N.Y., assignor to Bausch & Lomb Incorporated, Rochester, N.Y., a corporation of New York
Filed Sept. 19, 1961, Ser. No. 139,301
2 Claims. (Cl. 88—57)

This invention relates to an optical system for optical projectors and more particularly it relates to a catadioptric relay system which is particularly adapted for use in contour projectors.

In general, the optical systems for contour projectors and the like which include an optical relay system are characterized by great axial length so that the resulting overall dimensions of the projector are necessarily unduly large. This condition means that large areas of floor or bench space must be used and crowding of usable shop space may be caused thereby.

It is an object of this invention to provide an optical relay system of comparatively short or moderate axial length so that apparatus in which the system is used, such as contour projectors, may be reduced in exterior dimensions and bulk as well as the cost thereof.

A further object of this invention is to provide such an optical relay system whereby the point to point magnification of the image formed thereby is strictly constant and without distortion for unity magnification as well as near unity magnification, said system being corrected in a superior manner for spherical and chromatic aberrations, coma and flatness of field.

Further objects and advantages will be apparent to those skilled in the art by reference to the specification herebelow taken together with the accompanying drawing in which, FIG. 1 shows an optical diagram of one form of optical relay system constructed according to my invention and, FIG. 2 is a view similar to FIG. 1 showing a second form of my invention.

Relay optical systems of the general type herebelow described are shown in the patent application Ser. No. 138,983 of Richard Altman, filed September 18, 1961, assigned to the same assignee as the present application and the present application discloses the constructional features of a plurality of preferred and practical optical forms in which said relay system may be constructed.

According to one such form of optical system which is generally designated by the numeral 10 in FIG. 1, said system comprises a positive lens 11 and a spherically curved concave mirror 12 which is coaxially aligned in confronting relation therewith and is spaced therefrom substantially at the infinity focus of lens 11. As shown schematically in FIG. 1 of the drawing, the optical system 10 is so constructed and arranged that an object designated by the letter O, to be observed is positioned at or within the depth of focus of lens 11 entirely on one side of and below the common optical axis 13 for the lens and mirror.

The free aperture of lens 11 is divided by any preferred means, such as the double apertured plate 14 having duplicate apertures 15 and 16, to restrict the passage of the incoming rays from the object O to the area included in the aperture 15. Image rays 17 passing through lens 11 strike the concave surface $R_m$ of the mirror 12 at its center point and are reflected back at 18 at the same reflectance angle as the incidence angle toward the upper half of the lens 11 where the rays are refracted and pass through the aperture 16 to the image position I.

The image so formed at I is conjugate to the object O and is preferably formed at unity magnification, although other proximate values of magnification may be obtained without involving serious distortion of the image. Any desired relative positioning of the object O and image I to serve various purposes is obtainable by the use of suitable mirrors and diaphragming structures as long as the basic conjugacy of the object and image is maintained.

The object distance and the image distance are denoted 19 and 20 respectively and are of equal numerical value when the magnification of the image I is unity. The axial space between the apices of the lens 11 and mirror 12 is represented by the letter $D_1$ and is numerically actually equal to about .98 of the infinity focus of the lens.

In the optical systems here shown and described, the mirror 12 is so constructed with reference to the other parameters of the system as to act as the aperture stop of said system.

Because of the specific favorable choice of construction parameters for the lens 11 and mirror 12 as described hereinafter, a favorable short overall distance between the object O and the mirror surface $R_m$ of about 1.3 of the infinity focus of the lens is achieved.

Although any preferred form of illumination of the object O may be used with the optical system 10, an episcopic illumination system 21 illustrated in FIG. 1 is especially well adapted to this optical system. Said illumination utilizes basically a lamp 22 and a condenser lens 23 in alignment therewith, the optical axis of said lens 23 being obliquely directed through the approximate center of the lower aperture 15 so the entire front surface of the object O is illuminated.

For focusing purposes, the lens 11 and mirror 12 are in effect rigidly connected together as symbolically shown by a bar 24 in FIG. 1 for movements in unison whereby both conjugates of the optical system 10 are changed by the same amount and no change in the distance $D_1$ or the image magnification occurs.

Among the outstanding advantages provided by the optical system 10 are the excellent flat field and the near perfect freedom from distortion of the image. Additionally astigmatism, coma, and all spherical and chromatic aberrations have been corrected to extremely low residual values. Since the optical system is used in a comparison or contour projector, not shown, said system is designed to provide a point to point magnification over the entire image which is strictly constant thereby resulting in a precise reproduction of all contour shapes.

The radius $R_m$ of the concave reflective surface of the mirror 12 is so chosen as to provide a Petzval sum therefor which is optimumly balanced with the Petzval sum of the lens 11 whereby the aforesaid excellent flat field is achieved, provided that, in addition, the astigmatism of the lens and mirror is similarly balanced, as in the systems herein described.

In the preferred form of the invention as shown in FIG. 1, the inventor has determined that the positive lens 11 should be an achromat and should include a negative meniscus element $L_1$ having lens radii $R_1$, $R_2$, and a positive double convex element $L_2$ having lens radii $R_2$ and $R_3$. The negative element should have a focal length of substantially $-.626f$ and the positive element should be substantially $+.37f$ where $f$ represents the infinity focus of lens 11. The difference between the values of refractive index of the glass in these two elements should be between .090 and .130 with the higher index in the negative lens element and the difference between the $\nu$ values of the two elements should be between 23.0 and 35.0.

For acceptable performance, the constructional data for the optical system here disclosed should be within the ranges of values given in the table herebelow wherein $R_1$, $R_2$ and $R_3$ denote the refractive surfaces, $R_m$ denotes the mirror surface, $t_1$ and $t_2$ represents the thickness of the individual lens elements and $f$ represents the infinity focus of said lens 11.

$$.75f < R_1 < .85f$$
$$.25f < R_2 < .30f$$
$$1.10f < -R_3 < 1.50f$$
$$1.30f < -R_m < 1.60f$$
$$.015f < t_1 < .023f$$
$$.024f < t_2 < .030f$$

wherein the minus (−) sign applies to those ray deviating surfaces which have their centers of curvature located on the entrant side of the vertex of such surfaces.

A specific successful formulation of constructional data related to an optical system as shown in FIG. 1 is given in the table herebelow wherein the object and image distances 19 and 20 respectively are substantially alike and are equal to substantially $.32f$, and the relative aperture therefor is $f/13.0$.

$$R_1 = .754f$$
$$R_2 = .278f$$
$$R_3 = -1.382f$$
$$R_m = -1.49f$$
$$t_1 = .0209f$$
$$t_2 = .0257f$$
$$D_1 = .98f$$
$$n_D (L_1) = 1.720$$
$$n_D (L_2) = 1.611$$
$$\nu (L_1) = 36.2$$
$$\nu (L_2) = 58.8$$

wherein $D_1$ represents the axial distance between lens 11 and mirror 12. The focal length of said negative lens element and said positive lens element is respectively $-.626f$ and $+.37f$.

A second form of the invention is shown in FIG. 2 and is generally designated by the numeral 30, the constructional data therefor differing somewhat from FIG. 1 particularly as to the construction of its lens.

Optical system 30 is composed of a positive lens 31 composed of three lens elements in surface contact, which together have an infinity focus of 724.95 mm. Lens 31 is formed of a front negative meniscus lens element $L_3$, a central positive double convex lens elements $L_4$, and a rear negative lens element $L_5$, the focal length of $L_3$ being substantially $-.573f$ and the focal length of the combination of $L_4$ and $L_5$ being substantially $+.363f$.

An object O is positioned at an object distance 32 at or within the depth of focus of lens 31, similarly to FIG. 1 and therefore the image-forming rays are transmitted through an aperture 33 in an aperture plate 34 and refracted by the lens 31.

A concave mirror 35 having a spherically curved reflecting surface $R_m$ is located coaxially with lens 31 at a distance $D_2$ which is substantially equal to the infinity focus of the lens, $D_2$ being the axial distance between the rear surface of the lens and mirror surface $R_m$. Image rays 36 coming from lens 31 meet at the axis of the mirror surface $R_m$ and are reflected therefrom along a corresponding oblique path 37 to points on the lens above its axis. The upper rays 37 pass through an aperture 38 in aperture plate 34 after refraction by lens 31 to form an image I at an image distance 39 which is conjugate to the object distance 32.

One specific set of values of constructional data for optical system 30 which satisfies all of the stated objects of this invention is given in the table herebelow, wherein $R_1$, $R_2$, $R_{2a}$ and $R_3$ denote the refractive curvatures of lens elements $L_3$, $L_4$ and $L_5$, $t_1$, $t_{2a}$, $t_{2b}$ designate the thicknesses of said lens elements, and $n_D$ and $\nu$ represent the refractive index and Abbe number respectively thereof and $f'$ denotes the infinity focus of said lens 31.

$$R_1 = .824f'$$
$$R_2 = .273f'$$
$$R_{2a} = -.886f'$$
$$R_3 = -1.21f'$$
$$R_m = -1.41f'$$
$$t_1 = .0170f'$$
$$t_{2a} = .0151f'$$
$$t_{2b} = .0121f'$$
$$n_D (L_3) = 1.720$$
$$n_D (L_4) = 1.617$$
$$n_D (L_5) = 1.617$$
$$\nu (L_3) = 36.2$$
$$\nu (L_4) = 54.9$$
$$\nu (L_5) = 36.6$$
$$D_2 = \text{substantially } .98 f'$$

absolute values wherein the minus (−) sign applies to those ray deviating surfaces which have their centers of curvature located on the entrant side of the vertex of such surfaces.

For focusing purposes, lens 31 is connected in any preferred manner rigidly to the mirror 35 as schematically shown by the connector bar 40 so that both optical members travel as a unit.

Although only certain forms of this invention have been shown and described in detail, other forms are possible and changes may be made in the details and arrangement of the parts thereof without departing from the spirit of the invention as defined in the appended claims.

I claim:

1. A catadioptric optical system for use in a comparison projector or the like which forms an image of an object, said system being afocal and telecentric and comprising a positive lens and a concave spherical mirror which is optically aligned in confronting relation therewith and is axially spaced therefrom substantially at the infinity focus of said lens, said system being so constructed and arranged as to align said object on one side of the lens axis within its depth of focus, said system further forming a conjugate image of said object on the same side of the lens as the object and on the opposite side of said axis therefrom, said lens including a negative and a positive element designated $L_1$ and $L_2$ respectively, the optical data related to said system being given in the mathematical statements herebelow, $$R_1 = .754f$$
$$R_2 = .278f$$
$$R_3 = -1.382f$$
$$R_m = -1.49f$$
$$t_1 = .0209f$$
$$t_2 = .0257f$$
$$D_1 = .98f$$
$$n_D (L_1) = 1.720$$
$$n_D (L_2) = 1.611$$
$$\nu (L_1) = 36.2$$
$$\nu (L_2) = 58.8$$

absolute values wherein $f$ represents the infinity focus of said lens, $R_1$ and $R_3$ denote the radii of the exterior front and rear refractive surfaces respectively of said lens, $R_2$ denotes the radius of the interface refractive surface between said negative element and positive element, $R_m$ denotes the radius of said concave mirror, $t_1$ and $t_2$ denote the axial thicknesses of said negative and positive elements $L_1$ and $L_2$ respectively, $D_1$ represents the axial distance between the apices of the confronting surfaces $R_3$ and $R_m$, and $n_D$ and $\nu$ represent the refractive index and Abbe number respectively of the glasses from which the lens is made, the focal lengths of lens elements $L_1$ and $L_2$ being respectively $-.626f$ and $+37f$ where the minus (−) sign denotes negative focal length whereby an image of superior quality and extreme flatness is produced along with a short overall length of said system.

2. A catadioptric optical system for use in a comparison projector or the like which forms an image of an object, said system being afocal and telecentric and comprising a positive lens member which is composed of a front negative meniscus lens element designated $L_3$, an intermediate double convex lens element $L_4$ in contact with element $L_3$, and a rear negative meniscus lens element $L_5$ in contact with element $L_4$, said system further comprising a concave spherical mirror having a surface designated $R_m$ which is optically aligned with and confronting lens element $L_4$ at an axial distance $D_2$ therefrom which is substantially equal to the infinity focal length of the lens member, the object to be projected being aligned at a conjugate position with the image formed thereof on the same side of the lens member but laterally displaced therefrom by an equal distance from the lens member axis, the constructional data for the lens member and mirror having numerical values as given in the table herebelow wherein $R_1$ designates the radius of the front surface of lens element $L_3$, $R_2$ designates the radius of the interface between elements $L_3$ and $L_4$, $R_{2a}$ designates the radius of the interface between elements $L_4$ and $L_5$, and $R_3$ designates the radius of the rear surface of element $L_5$, the minus (—) sign used with the numerical values of the above radii applying to those surfaces which have their centers of curvature lying on the entrant side of the vertices of said surfaces, $D_2$ represents the axial distance between said lens member and mirror, $t_1$, $t_{2a}$ and $t_{2b}$ represent the axial thicknesses of the lens elements $L_3$, $L_4$ and $L_5$ respectively, $n_D$ and $\nu$ represent the refractive index and Abbe number respectively of the lens materials, and $f'$ represents the focal length of said lens member, $$R_1 = .824 f'$$
$$R_2 = .273 f'$$
$$R_{2a} = -.886 f'$$
$$R_3 = -1.21 f'$$
$$R_m = -1.41 f'$$
$$t_1 = .0170 f'$$
$$t_{2a} = .0151 f'$$
$$t_{2b} = .0221 f'$$
$$D_2 = .985 f'$$
$$n_D (L_3) = 1.720$$
$$n_D (L_4) = 1.617$$
$$n_D (L_5) = 1.617$$
$$\nu (L_3) = 36.2$$
$$\nu (L_4) = 54.9$$
$$\nu (L_5) = 36.6$$

absolute values said lens element $L_3$ per se having a focal length of $-.573f'$ and lens elements $L_4$ and $L_5$ together serving as a color corrector and having jointly a focal length of $+.363f'$.

References Cited in the file of this patent
UNITED STATES PATENTS

| | | |
|---|---|---|
| 1,783,998 | Chretien | Dec. 9, 1930 |
| 2,742,817 | Altman | Apr. 24, 1956 |

UNITED STATES PATENT OFFICE
CERTIFICATE OF CORRECTION

Patent No. 3,115,537 December 24, 1964

Thomas S. Bird

It is hereby certified that error appears in the above numbered patent requiring correction and that the said Letters Patent should read as corrected below.

Column 6, line 10, for "$t_{2b}=.0221f'$" read -- $t_{2b}=.0121f'$ --.

Signed and sealed this 9th day of June 1964.

(SEAL)
Attest:
ERNEST W. SWIDER
Attesting Officer

EDWARD J. BRENNER
Commissioner of Patents